United States Patent
Åkerfeldt

(10) Patent No.: US 12,274,936 B2
(45) Date of Patent: Apr. 15, 2025

(54) METHOD AND SYSTEM FOR PROVIDING A MULTIPLAYER GAME

(71) Applicant: Unordinal AB, Sollentuna (SE)

(72) Inventor: Erik Åkerfeldt, Sollentuna (SE)

(73) Assignee: UNORDINAL AB, Sollentuna (SE)

( * ) Notice: Subject to any disclaimer, the term of this patent is extended or adjusted under 35 U.S.C. 154(b) by 358 days.

(21) Appl. No.: 17/503,635

(22) Filed: Oct. 18, 2021

(65) Prior Publication Data

US 2022/0143498 A1    May 12, 2022

(30) Foreign Application Priority Data

Nov. 6, 2020   (SE) .................................... 2030332-7

(51) Int. Cl.
  *A63F 13/352*  (2014.01)
  *A63F 13/358*  (2014.01)
  *A63F 13/822*  (2014.01)

(52) U.S. Cl.
  CPC .......... *A63F 13/352* (2014.09); *A63F 13/358* (2014.09); *A63F 13/822* (2014.09); *A63F 2300/535* (2013.01); *A63F 2300/5533* (2013.01)

(58) Field of Classification Search
  CPC ...... A63F 13/31; A63F 13/352; A63F 13/358; A63F 13/493; A63F 13/822; A63F 2300/535; A63F 2300/5533
  See application file for complete search history.

(56) References Cited

U.S. PATENT DOCUMENTS

| | | | |
|---|---|---|---|
| 6,826,523 B1 * | 11/2004 | Guy | A63F 13/352 709/227 |
| 8,595,366 B2 * | 11/2013 | Mukundan | H04L 49/1576 709/227 |
| 8,612,196 B2 * | 12/2013 | Rosedale | G06F 30/20 703/13 |
| 10,148,722 B2 * | 12/2018 | Åkerfeldt | H04L 65/70 |
| 10,398,986 B1 * | 9/2019 | Henroid | A63F 13/795 |
| 10,523,586 B2 * | 12/2019 | Bai | H04L 47/783 |
| 10,579,434 B2 * | 3/2020 | Harkness | A63F 13/837 |
| 10,643,010 B2 * | 5/2020 | Lewis | G06F 9/4856 |
| 10,878,146 B2 * | 12/2020 | Lewis | G06Q 10/063116 |
| 2008/0280683 A1 * | 11/2008 | Nakaji | H04L 67/131 463/40 |
| 2010/0273545 A1 * | 10/2010 | Salonen | G07F 17/32 463/11 |

(Continued)

FOREIGN PATENT DOCUMENTS

JP   2012085834 A   5/2012

*Primary Examiner* — William H McCulloch, Jr.
(74) *Attorney, Agent, or Firm* — Tucker Ellis LLP

(57) ABSTRACT

A method for providing a multiplayer game to a player in a computer network. The method includes connecting a player to a first game server, providing the player with a game, and monitoring the game. The method includes detecting a predetermined event in the game, and in response to the detecting, disconnecting the player from the game server and providing the game to the player. The method includes monitoring the game servers and selecting a second game server with suitable game state data. The method includes providing server information for the second game server to the game client, and connecting the game client to the second game server and providing the second server game from the second game server to the player.

10 Claims, 3 Drawing Sheets

(56) References Cited

U.S. PATENT DOCUMENTS

| | | | | |
|---|---|---|---|---|
| 2010/0293365 A1* | 11/2010 | Tandon | ................... | A63F 13/77 |
| | | | | 717/121 |
| 2011/0276333 A1* | 11/2011 | Wang | ...................... | G10L 25/48 |
| | | | | 704/E21.001 |
| 2012/0178535 A1* | 7/2012 | Short | ..................... | G06Q 40/06 |
| | | | | 463/43 |
| 2012/0284354 A1* | 11/2012 | Mukundan | .......... | H04L 49/1576 |
| | | | | 709/208 |
| 2016/0080505 A1* | 3/2016 | Sahin | ................. | H04L 67/1027 |
| | | | | 709/229 |
| 2018/0048587 A1* | 2/2018 | Bai | ....................... | H04L 47/783 |
| 2020/0306646 A1 | 10/2020 | Chaput et al. | | |
| 2022/0143498 A1* | 5/2022 | Åkerfeldt | ............. | A63F 13/352 |

\* cited by examiner

METHOD AND SYSTEM FOR PROVIDING A MULTIPLAYER GAME

RELATED APPLICATION DATA

This application claims the benefit of Swedish Patent Application No. 2030332-7, filed Nov. 6, 2020, the disclosure of which is incorporated herein by reference in its entirety.

TECHNICAL FIELD

The present disclosure relates generally to methods, systems and devices for providing a multiplayer game.

BACKGROUND

Today, online multiplayer games are played by millions of people every day. There are many different types of games, and different types of playstyles, but a common denominator for all of them are that they require game servers for hosting a plurality of different players at the same time, in a virtual world controlled by the game server.

One reason for the popularity of multiplayer games is that it enables people to connect with others while playing, making it into a social activity instead of something a player does alone. By playing against other humans instead of computer-controlled entities, the games also feel more alive and players for a greater connection to the game.

Online multiplayer games come in many different shapes and forms, ranging from first person shooters to strategy and role-playing games, including a popular genre called "battle royale", which is a game style where hundreds of players are gathered on the same server and battle it out, until there is only one player standing.

However, when playing an online multiplayer game, such as a battle royale game, some things are zero-sum, which entails that in order for one player to have a gaming experience with a positive outcome, such as scoring a kill on an enemy, another player needs to have a gaming experience with a negative outcome, such as being killed by an enemy. Generally speaking, players enjoy positive experiences more than negative ones, and this can be a negative aspect which causes some people to shy away from multiplayer games. Thus, in order for some people to enjoy the game more, others have to enjoy it less.

It would be beneficial if this paradigm could be changed in a way such that more players can be provided positive player experiences, without requiring more people to have a negative experience.

SUMMARY

It is an object of the invention to address at least some of the problems and issues outlined above.

As has been realized by the inventor, to improve the game experience for a player it can be beneficial if the active game time can be increased. In other words, if the time a player can have an active playing session where game action is ongoing the experience of the game can be improved.

In order to improve the game up-time where the gaming computer (the computer or client via which a player plays a game) is active in a game a seamless transition from a multiplayer game mode to a single player game mode, and then back to a multiplayer game mode can be provided for a gaming computer participating in an online multiplayer game. Hereby longer continuous gaming experiences without interruptions to a player than what is being provided today can be provided. In other words, the in-game time can be increased.

Methods, systems and devices for providing such a transition in a multiplayer game are set out in the appended claims.

In accordance with one aspect of the invention a method for providing a multiplayer game in a computer network is provided. The computer network comprises a plurality of game servers. Each game server comprises a plurality of game slots for the multiplayer game. Each game server is adapted to provide a game to game clients connected to that game server. Each game server comprises game state data describing the state of the game. The computer network comprises a game client adapted for providing a game. The game client is capable of connecting to the plurality of game servers. The computer network further comprises an arbiter node adapted for monitoring the plurality of game servers and at least one game client connected to one game server of the plurality of game servers. The method comprises to connect the game client to a first game server and to provide a first multiplayer game from the first game server to the game client while the game client is connected to the first game server. The method further comprises to monitor by the arbiter node the state of the first game being provided from the first game server and to detect a predetermined event in the first game being provided from the first game server. In response to the detecting a predetermined event, the game client is disconnected from the first game server and a single player game is provided by the game client. The method further comprises to monitor in the arbiter node the plurality of game servers in order to find other game servers with suitable game state data and selecting a second game server based on game state data. Server information for the second game server is then provided to the game client; and the game client is connected to the second game server and providing a second multiplayer game from the second game server.

In accordance with one embodiment the game state data of the game client being provided to the player upon the game client disconnecting from a game server is substantially the same as the game state data of the game server except for the predetermined event.

In accordance with one embodiment, selecting a second server with similar game state data comprises selecting a server with similar layout information.

In accordance with one embodiment, the predetermined event comprises that a player is eliminated in the game.

In accordance with one embodiment, the method further comprises monitoring player state data describing a state of the player while the player is being provided the game.

In accordance with one embodiment, the method further comprises to transmit the player state data from the game to the second game server.

In accordance with one embodiment, the detecting a predetermined event in the game comprises obtaining a message from the first game server regarding the predetermined event.

In accordance with one embodiment, the method further comprises to provide game client information for the game client to the second game server, prior to connecting the game client to the second game server.

In accordance with one embodiment, the game client information for the game client to the second game server comprises current status information about a player character in the game.

In accordance with a second aspect of the invention, a computer program comprising computer readable code means to be run in an arbiter node or a game client of a computer network is provided where, the computer network comprises:
- a plurality of game servers, each game server comprising a plurality of player slots for the multiplayer computer game, each game server providing a game to game clients connected to the game server, each game server comprising game state data describing the state of the game;
- a game client, providing a game to a game computer, the game client being capable of connecting to the plurality of game servers;
- an arbiter node adapted for monitoring the plurality of game servers and each game client connected to one of the plurality of game servers;
- which computer readable code means when run in the arbiter node causes the arbiter node to perform the following steps:
- connecting the game client to a first game server;
- providing the first game from the first game server to the game computer while the game client is connected to the first game server;
- monitoring by the arbiter node the game being provided from the first game server;
- detecting a predetermined event in the game being provided from the first game server;
- in response to detecting the predetermined event, disconnecting from the game server and providing a client game by the game client;
- monitoring the plurality of game servers in order to find other game servers with suitable game state data;
- selecting a second game server based on game state data;
- providing server information for the second game server to the game client; and
- connecting the game client to the second game server and providing the second game from the second game server to the game computer.

In accordance with a third aspect of the invention, a carrier containing the computer program according to the above, wherein the carrier is one of an electronic signal, optical signal, radio signal or computer readable storage medium.

In accordance with another aspect of the invention a game client adapted for providing a multiplayer game in a computer network is provided. The game client is adapted for connecting to a plurality of game servers. Each game server comprises a plurality of game slots for the multiplayer game. Each game server is adapted for providing a game to game clients connected to that game server, and each game server comprises game state data describing the state of the game. The game client is adapted to obtain a first multiplayer game from a first game server. The game client is further adapted to obtain a message from an arbiter node to disconnect from the first game server and to provide a single player game in response to the message from the arbiter node. The game client if further adapted to obtain from an arbiter node server information for a second game server and to connect the game client to the second game server and providing a second multiplayer game from the second game server.

In accordance with a further aspect of the invention an arbiter node for use in a computer network providing a multiplayer game is provided. The arbiter node being adapted for connecting to a plurality of game servers. Each game server comprises a plurality of game slots for the multiplayer game, and each game server is adapted for providing a game to game clients connected to that game server. Each game server comprises game state data describing the state of the game. The arbiter node is adapted to connect to a game client in a first multi-player game provided by a first game server. The arbiter node is further adapted to monitor the state of the first game being provided from the first game server and to detect a predetermined event in the first game being provided from the first game server. In response to detecting the predetermined event, the arbiter node is adapted to send a message to the game client with information about the predetermined event. The arbiter node is further adapted to monitor the other game servers in order to find other game servers with suitable game state data and to select a second game server based on game state data. The arbiter node is further adapted to provide server information of the second game server to the game client.

According to other aspects, computer programs and carriers, computer systems and the like are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
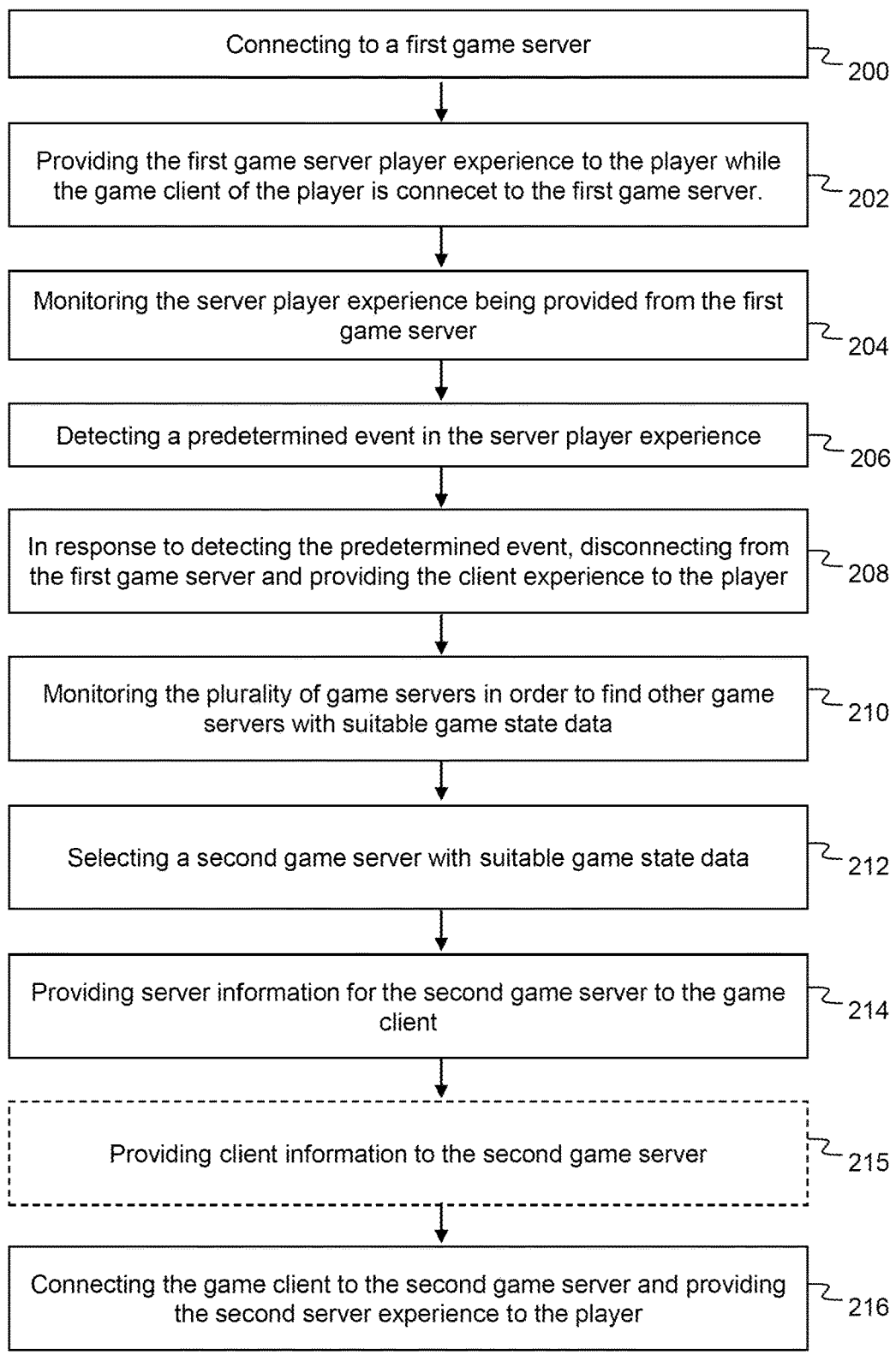
FIG. 1 is a flow diagram of a method according to an embodiment.

Briefly described, the present disclosure relates to methods, systems and computer programs for providing a multiplayer game in a computer network, such as the Internet. The present disclosure builds upon a realization that the current way players are being provided multiplayer experience can be changed fundamentally by letting the game client control the game, rather than the game server. This entails that the game client can choose to ignore a negative outcome for the player that occurs on the game server, by seamlessly switching the player over to a single player game at the same time the negative impact occurs on the game server, and instead providing a positive outcome for the player in the single player mode. The player can then continue to be provided a single player experience in a virtual world with substantially the same game state as the multiplayer gaming game, without having to experience the negative outcome. The method then further comprises selecting another game server which also has substantially the same game state, and then switching the player back to a multiplayer game again on the newfound server. From the point of view of the player (the game computer or client run by a player), the transition from multiplayer to single player as well as vice versa, should be as seamless as possible, preferably such that the player experiences it as a single uninterrupted game. Thus, the player can be provided with longer gaming sequences that are uninterrupted from a gaming experience point of view, even though the player is actually switching between multiplayer to single player and back to multiplayer again. Hereby the time a game computer is actually in an ongoing game can be increased and idle time reduced or even eliminated.

Another problem which the present disclosure can greatly help to improve, is low average utilization of game servers. Again, the battle royale genre will be used as an example of how and why this occurs.

When a game starts, players connect to a game server with a limited amount of player slots, for example 100 slots, for one round of a multiplayer game. When all the slots have been filled, the game starts and each player loads the virtual world in which the multiplayer game is about to take place. Thus, when the game starts, server utilization is full, i.e., at 100%, since 100 out of 100 slots are filled. However, as time goes players are eliminated, and the number of players on the server beings to decline accordingly. As will be understood, when half of the players have been eliminated, the game server will be at 50% utilization rather than 100%.

The rate of players being eliminated tends to decrease significantly as the game goes on, and this further exacerbates the problem of low server utilization. In other words, the first 50 eliminations may occur during the first 10 minutes, but the remaining 50 may take another 50 minutes to complete. As will be understood, the average server utilization in the above example will be much lower than 50% for the duration of a round of the game. Today, the average server utilization for online multiplayer games is usually somewhere around 20-30%.

The reason for the low server utilization is basically an inherent problem with the current paradigm of how some multiplayer games, such as battle royal games, work, where players join a game server until it fills up, whereafter the game is started and no new players can join until the game has ended, and while the game is ongoing, all of the players are required to follow the rules and decisions of the game server. However, by using systems and methods as disclosed herein, a new way of providing multiplayer experiences to players can be achieved, one in which server utilization can be greatly increased.

This is achieved by having game servers that makes it possible for the server to join new game computers/clients during an ongoing game, instead of not allowing any new game computers to join between the start and completion of a game round. In current systems, this would generally not be advisable, since the state of the virtual world changes during the duration of a game, such that the virtual world looks different after 30 minutes game time than it did in the beginning of the round. However, when allowing players to disconnect from game servers based on decisions from the game client, there will be a pool of players which are looking for virtual worlds with different game states, and thus a demand is created for players joining in halfway through rounds.

Looking now at FIG. 1, steps of a method for providing a multiplayer game in a computer network according to an embodiment will now be described in more detail. The method may be a computer implemented method. In some embodiments the method may be performed by an arbiter node. In some embodiments the method may be performed by a game client. In some embodiments it may be performed by both an arbiter node and a game client.

The computer network comprises a plurality of game servers, each game server comprising a plurality of player slots for the multiplayer game and each game server providing a server player experience (a computer game) to each game client connected to the game server. Each game server comprises game state data describing the state of the game.

The computer network further comprises a game client, the game client providing a client player experience (the game) to a player, typically using a game computer, using the game client, and being capable of connecting to the plurality of game servers. The player is interacting with the game client, and the game client controls the player experience, but while the game client is connected to a game server, the game server will provide the server experience to the game client and the game client will in turn provide the server experience (the game run on the server) to the player, generally without modification, up until such a time that an event is detected which causes the game client to instead disconnect from the game server and provide the player with the client gaming experience being a single player game.

The method comprises connecting 200 the game client to a first game server. The method further comprises providing 202 the first server player experience (a first multiplayer game) to the player while the game client of the player is connected to the first game server.

As mentioned, each game server provides a server player experience to each game client connected to them, in such a way that all of the game clients connected to one server are provided the same virtual reality. As will be understood, not every player is shown all of that reality at the same time, depending on which game is being played they will generally have different perspectives.

The first game server provides a first server experience (a first game), a second game server provides a second server experience (a second game), and so on. The method as described herein enables transferring players between games run on a game server and a game run on a game client where the games have substantially the same virtual surroundings and layout. In gaming terms, this may be referred to as using the same map. Thus, a player interacting can be switched between different games hosted by different game servers and games hosted by the game client where the different games have the same context data such that the player will experience the different games as one single ongoing game. This is so because there is no down time where the game enters an idle mode. Further because context data is preserved and forwarded to the next game, the game will be viewed as one single game whereas in fact there has been a transition to another game.

The method further comprises monitoring 204 the server player experience being provided from the first game server to the game client. The monitoring 204 is done in order for the game client and/or arbiter to have knowledge about what is happening in the virtual world of the first game server, in order to detect which events are occurring. As mentioned, the game client provides the first server experience to the player while the game client is provided to the first game server, but the monitoring step allows the client to be on the lookout for events that may negatively impact the player experience. Typically, such an event is the game entering an idle mode for a particular player. This can for example happen if the player is eliminated in an ongoing game or if there is as malfunction in the server or in the server connection to which the game client is currently connected such that the game can no longer be rendered by the game client.

Thus, the method further comprises detecting 206 a predetermined event in the server player experience. The predetermined event may be virtually anything, and in some embodiments the predetermined events may be selectable by the player and/or the game client. In some embodiments, the predetermined event is a negative event for the player. In some embodiments, the predetermined event comprises that the player is eliminated in the game, for example by being eliminated by another player.

The method further comprises, in response to detecting the predetermined event, disconnecting 208 the game client from the first game server and providing the client experience to the player, instead of the server player experience. In other words, the game client terminates the ongoing multiplayer game and starts a single player game that the player can continue play instead of the multiplayer game.

When the predetermined event is detected, there will be a time period between when the game client is being provided the server experience and when the game client provides the same server experience to the player. This is the time period during which the game client can be disconnected from the game server in such a way that the player avoids a negative impact from the impacted game server, and is instead provided a client experience, without the negative experience or with a less negative experience. In other words, a game will continue whereby the in-game time will be increased compared to if the game had only been terminated without being switched to a single player game.

In other words, if it is detected that the server player experience being provided from the game server to the game client contains the predetermined event, the game client is disconnected from the game server before the part of the server experience containing the predetermined event is provided to the player.

In some embodiments, the method may further comprise providing a different outcome in relation to the predetermined event when the player is switched to the client player experience, compared to the server player experience. In some embodiments, the predetermined event may be a negative event, and the different outcome is a positive or less negative event.

An example of how this could play out in a multiplayer shooter game will now be described. Imagine a scenario in which the player, while connected to the first game server via the game client, enters a room with an enemy player in it. The two players get into a shooting match, which ends with each players firing shots towards each other. In this scenario, the enemy player manages to come out ahead, and eliminate the player, at least in the game server experience. However, when it is detected that the player would be eliminated by the enemy player, the game client is disconnected from the game server and the player is instead provided another virtual reality in which they were victorious in the shootout with the enemy player, with the caveat that it is no longer actually the same enemy player controlled by another human, but instead it is replaced with a computer-controlled entity replicating the enemy in the game client.

An aspect of the present invention is that the game client, or in relevant embodiments the arbiter node, can be allowed to make a determination to leave the server automatically, without input from the player and without asking for permission from the game server. This, in combination with monitoring the server player experience being provided from the server, creates a new paradigm in which players can keep having a continuous gaming experience, while in reality changing between multiplayer and single player and back to multiplayer, and sometimes while also avoiding negative outcomes in the game.

The method further comprises monitoring 210 the plurality of game servers in order to find other game servers with suitable game state data. In some embodiments, a game server with suitable game state data is a server having similar game state data as the first game server. This is done in order for the player to have a seamless experience of a playing a single round, rather than being thrown around different maps and rounds.

The game state data is the data describing the state of the game, and comprises all data relevant for this purpose. As will be understood, this includes virtually all data being provided by the game server to the game clients connected to it.

For example, the game state data will describe the position of all players, the outlook of the map including information such as whether or not the terrain has been destroyed, which weapons and how much ammunition each player has, the position of any bullets current in the air, and so on. Such data describing the layout of the virtual world can be referred to as layout information, and it is generally advantageous if the layout information can overlap as much as possible in order for the player to experience the transitions between single player and multiplayer as seamless as possible. In some embodiments, selecting a new server with similar game state data comprises selecting a server with similar layout information.

In some embodiments, monitoring 210 the plurality of game servers in order to find other game servers with suitable game state data comprises performing visual analysis of the virtual layout of the server. In some embodiments, selecting a game server with similar game state data comprises performing a text-based analysis of game state data.

In some embodiments, game state data may also comprise information such as the geographical location of the servers, preferred language of the server, available server capacity, number of free slots on the server, the price/cost of running the server, and similar information which is related to server conditions rather than actual in-game information.

The method further comprises, based on the monitoring 210, selecting 212 a second game server with suitable game state data. The selection may be performed such that the monitoring 210 comprises keeping an updated list over the servers having the most similar game state data to the first game server, and the selecting 212 comprises selecting the first server on the list, i.e., the server having the most similar game state data.

The method further comprises, upon selecting a second game server with suitable game state data, providing 214 server information for the second game server to the game client.

In some embodiments, the method may further comprise providing game client information to the second game server, so that the game server can know and authenticate that the player joining the server is the correct one, and in order to keep track of the player's statistics and other context data such as amount of health, weapons, ammunition, and similar information.

The method further comprises connecting 216 the game client to the second game server and providing the second server experience to the player. As will be understood, when the game client is connected to the second game server, the second game server starts providing the second server experience to the player, and then the game client in turns provides the second server experience to the player.

From a player point of view, all of the above steps 200-216 should not be experienced as switching between different servers, clients and rounds of the game, but instead the goal is to provide a continuous experience, which is as seamless as possible. This is enabled by allowing the game client to override decisions from the game server to which it is connected, which has not been done in the prior art.

The method steps 200-216 may be performed by the arbiter node, or by the game client. In some embodiments, the arbiter node may be incorporated into the game client. In some embodiments, some method steps are performed by the arbiter node and some are performed by the game client.

In some embodiments, the game state data of the client experience being provided to the player upon the game client disconnecting from a game server is substantially the same as the game state data of the game server in all aspects except for the predetermined event. In some embodiments, at least the layout information of the client experience is substantially the same as the layout information of the server experience. The purpose of this is to provide the player with as seamless of a transition as possible, preferably in a way that the player doesn't experience the transition from the server experience to the client experience.

In some embodiments, the arbiter node further monitors player state data describing a state of the player while the player is being provided the client player experience. The purpose of this is to ensure that the player doesn't try to cheat while having the client gaming experience, and having the arbiter node monitor the player state data can help ensure this. In some embodiments, the arbiter node transmits the player state data from the client player experience to the second game server. By having the arbiter node transmit the player state data, rather than the game client, the likelihood of a player cheating may be reduced.

In some embodiments, detecting a predetermined event in the server player experience comprises obtaining a message from the server regarding the predetermined event. This may be implemented in different ways, in some embodiments the game server may be informed about the predetermined event beforehand, and instructed to send a specific message regarding the predetermined event to the game client when it occurs. In some embodiments the game client actively has to look for the predetermined event, by monitoring communication from the game server.

In some embodiments, the method further comprises providing 215 game client information for the game client to the second game server, prior to connecting the game client to the second game server. By providing the game client information before the client is connected to the server, the server can ensure that it is the correct game client being connected.

Figure 2:
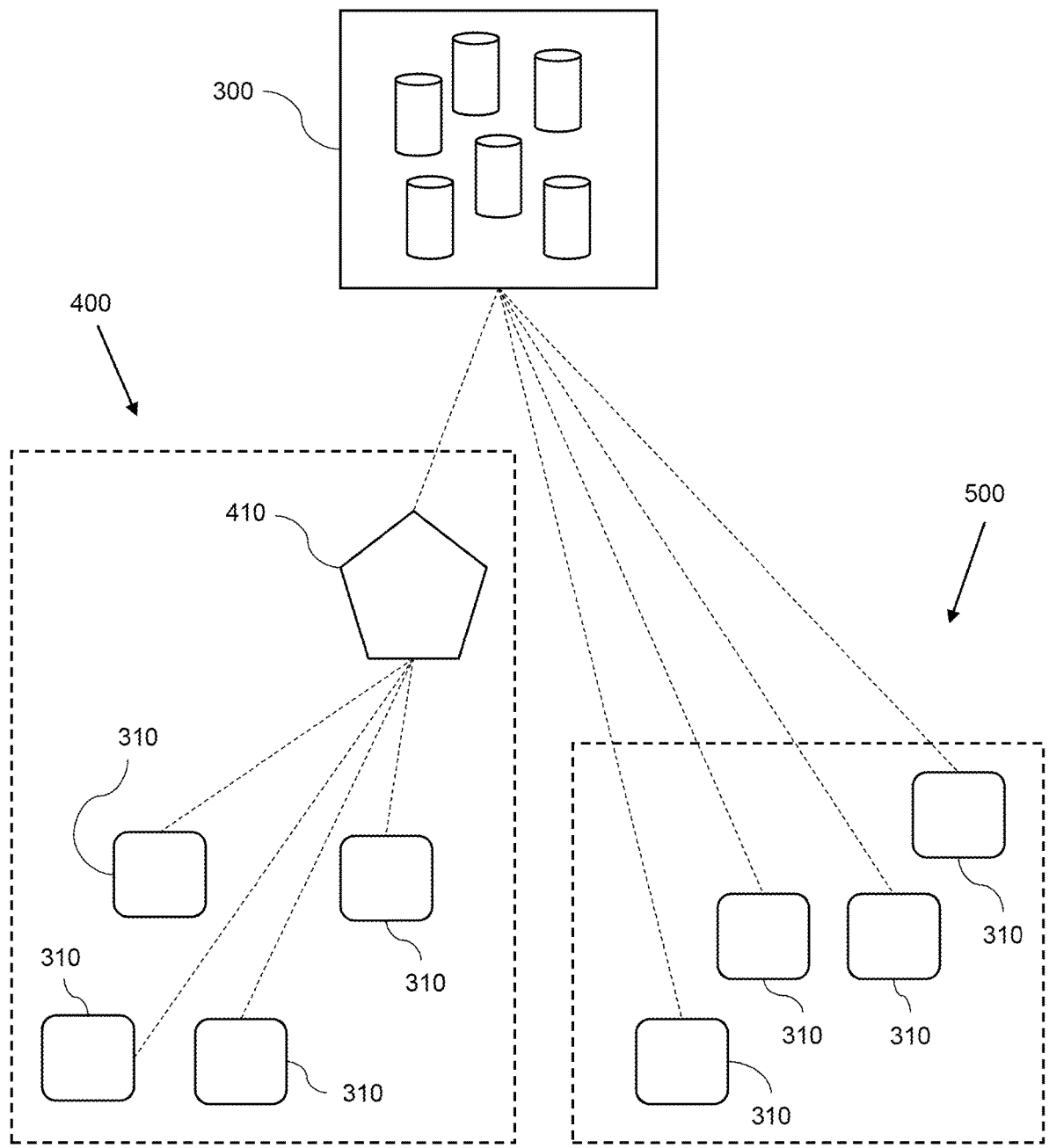
FIG. 2 is a block schematic of a system architecture according to an embodiment.

An architecture of a computer network in which the present disclosure is suitably implemented will now be described in further detail, with reference to FIG. 2. The computer network comprises a plurality of game servers 300, to which a plurality of game clients 310 are connectible. The game clients 310 provide an interface with which a player can interact in a game. There are at least two different relevant alternatives for implementing an architecture according to the present disclosure, both of which will now be described.

The first alternative comprises a first architecture 400 comprising an arbiter node 410 connected to the plurality of game servers 300, wherein all game clients 310 are connected to the arbiter node.

The second alternative comprises a second architecture 500, in which each game client 310 is connected to the plurality of game servers without an intermediate node.

In some embodiments, a combination of the first architecture 400 and the second architecture 500 is used, wherein each game client 310 is directly connected to the server, and also connected to the arbiter node 410. This entails that the game clients 310 can communicate with the game serves 300 directly, as well as through the arbiter node 410.

As will be understood, the connection between the plurality of servers 300 and the game clients may be any type of connection, but is typically a network connection over a network such as the Internet.

The main difference between the first alternative 400 and the second alternative 500 with respect to system architecture, is the implementation of the arbiter node 410. The arbiter node 410 is intended to act as an intermediary between each game client 310 and the plurality of game servers 300. In some embodiments, there is only one arbiter node in the entire system which handles all servers and all game clients, and in some embodiments, there may be a plurality of arbiter nodes. For example, there may be one arbiter node for every 1000 players, one per player, one per geographical area, one per language, one per game mode, and similar parameters. Also, the arbiter node can be implemented with redundant nodes. In embodiments with a plurality of arbiter nodes 410, the arbiter nodes 410 may communicate with each other.

The arbiter node 410 can provide a number of different functionalities. The arbiter node may for example manage the number of slots available at the game servers 300 to which it is connected. The arbiter node 410 may act as a control point in order to make sure that players do not try to cheat when disconnecting from one server and connecting to another one, for example by ensuring that there haven't been too large changes to the player's statistics. The arbiter node 410 may monitor the plurality of game servers 300 and keep track of the game state data of each game server. The arbiter node may monitor each game client connected to it and keep track of the game state data of each game client.

In embodiments wherein the game clients 310 are connected directly to the game servers 300 without an intermediate node, some or all of the functionality provided by the arbiter node 410 in embodiments comprising an arbiter node 410, may instead be provided by the game client 310. In some embodiments, each game client may comprise an arbiter node 410.

In some embodiments, the methods described herein may be provided in the form of a computer program. The computer program may comprise computer readable code means, which when run in a game client or an arbiter node causes the computer network to perform the steps described in any of the described embodiments of the method. The computer program may be carried by a computer program product connectable to the processing circuitry. The computer program product may be the memory. The memory may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory. Alternatively, the computer program may be stored on a server or any other entity connected to the computer network, to which the game client and/or arbiter has access. The computer program may then be downloaded from the server into the memory.

Figure 3:
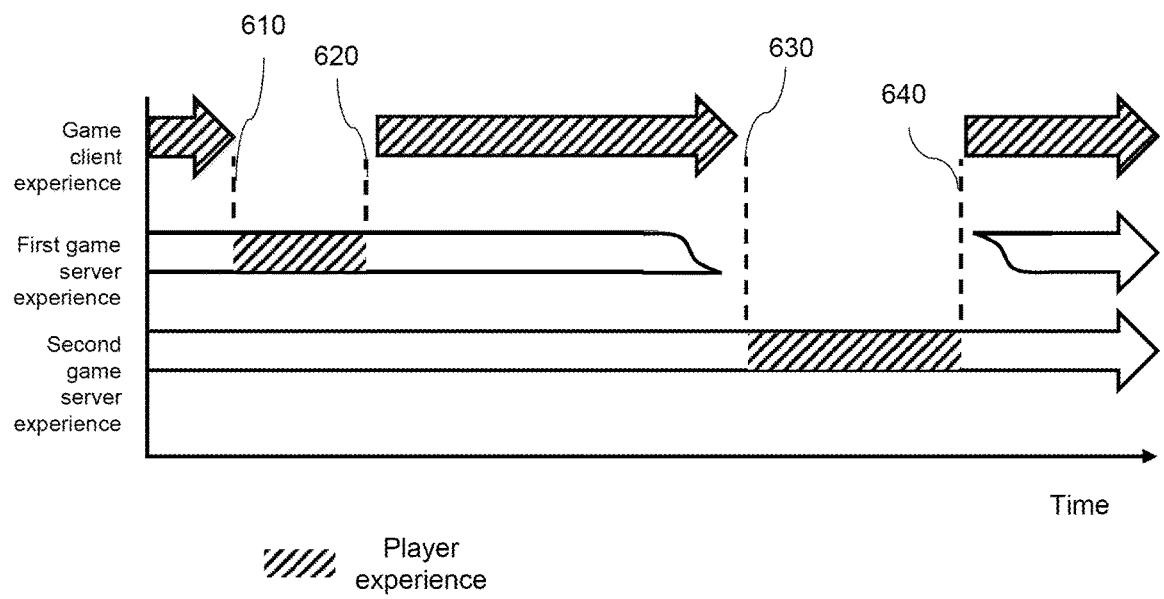
FIG. 3 shows how the player is provided the game client experience and game server experiences.

Looking now at FIG. 3, an example of how the player is provided a continuous experience while switching between the client experience and different game server experiences is shown. References to the method steps of FIG. 1 will be made in parenthesis for reference.

At first, the player is being provided the game client experience by the game client. The player is then connected 610 to a first game server (corresponding to step 200 of FIG. 1) by the game client. Typically, the player will start by joining a server, just as a regular multiplayer game, but the player may be provided a game client experience (such as a single player game) while waiting for the game server to start a round of the game. In some embodiments, the game client experience and the first game server experience are the same from the time when the player starts a new round of the game, until the first predetermined event is detected.

After joining the first game server, the player is provided the first game server experience (corresponding to step 202 of FIG. 1) in a first game, until such a point in time that a predetermined event is detected 620, which is typically a negative event for the player, such as being eliminated. During this time, the server player experience provided to the player by the first server is monitored (corresponding to step 204 of FIG. 1) When the predetermined event is detected, (corresponding to step 206 in FIG. 1) the player is disconnected from the first game server and is instead provided the game client experience (corresponding to step 208 in FIG. 1), such that the predetermined event does not occur in the game client experience. Thus, the game client sets up a single player context and typically with a game context that matches the multiplayer game on the first server.

The player is then provided the game client experience, i.e., a single player experience starting with all game state data being virtually the same as it was in the multiplayer experience provided by the first game server when the player was disconnected from it. During this time, other available game servers are monitored (corresponding to step 210 in FIG. 1), and in some embodiments the game client experience provided to the player is also monitored, in order to ensure that no cheating or similar is occurring. In some embodiments, the monitoring 210 is performed continuously and does not start only when the player is disconnected. In such embodiments, the arbiter node or game client may keep a continuously updated list with servers having the most similar game state data to the game server to which the player is currently connected.

When a new server with suitable game data has been selected (corresponding to step 212), the player is connected 630 to the second game server. The player connecting 630 to the second game server comprises providing the server information of the second game server to the game client (corresponding to step 214), and in some embodiments it also comprises providing game client information to the second game server (corresponding to step 215). After the game server information and optionally game client information has been provided to the appropriate entities, the player is connected to the second game server and is also provided the second game server experience (corresponding to step 216 of FIG. 1). Thus, the player will now be playing a multiplayer game on the second server.

As illustrated by FIG. 3, the player's experience is a continuous and unbroken one, without exiting the game, loading a new map, or other similar occurrences commonly associated with switching game servers. In reality, the player is being provided three different experiences (the game client experience, the first server experience and the second game server experience), but they are provided such that the transitions in between are seamless or close to seamless. The active in game time is hereby made higher.

Figure 4:
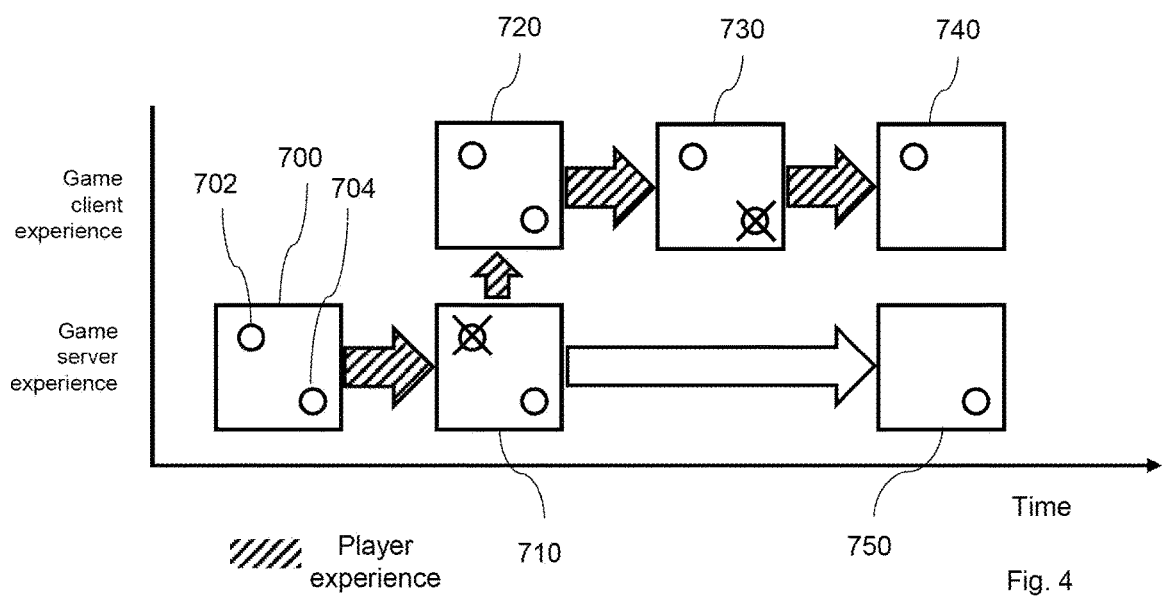
FIG. 4 shows an example of a transition from a game server experience to a game client experience.

Looking now at FIG. 4, another flow chart is shown describing a player experience transitioning between a game server experience and a game client experience, in this case with only one game server involved. The figure shows the player 702, represented on the left side in each event, and an opponent player 704.

At a first event 700, the player 702 is connected to the game server and is being provided the game server experience. The player 702 is in the vicinity of the opponent 704, for example by being in the same room.

Then, a second event 710 occurs, which is a negative event for the player, such as the player 702 being eliminated by the opponent 704. Within the game, this could take place through a battle between the player 702 and his opponent 704, wherein the opponent 704 is victorious.

Upon detecting that the player 702 has been eliminated, a decision is made to disconnect the player 702 from the game server and instead provide the player with the game client experience, such that the player doesn't need to experience the negative event 710. Thus, when detecting that the negative event 710 has occurred, the game client or arbiter instead disconnects the player and provides him with a new event 720, wherein the negative experience is removed or its negative impact is decreased. From the perspective of the player, the new event 720 is similar to the starting point 700, in other words it is as if the negative event 710 did not occur. However, everything up until the actual negative even, in this case the player 702 being eliminated, is the same. Thus, in the new event 720, the player will be in the middle of his battle with the opponent 704, with the exception that the opponent 704 has now been switched to a computer-controlled entity instead of another human player.

The player 702 can then go on to eliminate his opponent 704 in the game client experience in an event 730, and be rewarded with a positive experience 740 in which the player 702 successfully eliminated his opponent 704 without being eliminated himself.

On the server side, the second player 704 simply experiences the event 710, but from the view of the second player 704 this is instead a positive event, since the second player eliminated the first player 702. Thus, from the view of the second player, the server client experience is provided the whole time, and simply transitions from event 710 to event 750, in which the second player 704 has been victorious and the first player 702 has been eliminated.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for providing a multiplayer game in a computer network, the computer network comprising:
   a plurality of game servers, each game server comprising
      a plurality of game slots for the multiplayer game, each
         game server adapted for providing a game to game clients connected to that game server, each game server comprising game state data describing the state of the game;
a game client adapted for providing a game, the game client being capable of connecting to the plurality of game servers; and
an arbiter node adapted for monitoring the plurality of game servers and at least one game client connected to one of the plurality of game servers;
wherein the method comprises:
connecting the game client to a first game server;
providing a first multiplayer game from the first game server to the game client while the game client is connected to the first game server;
monitoring by the arbiter node the state of the first game being provided from the first game server;
detecting a predetermined event in the first game being provided from the first game server, wherein the predetermined event comprises that a player is eliminated from the first game;
in response to the detecting a predetermined event, disconnecting the game client from the first game server and providing by the game client a single player game;
monitoring in the arbiter node the plurality of game servers in order to find other game servers with suitable game state data;
selecting a second game server based on game state data;
providing server information for the second game server to the game client; and
connecting the game client to the second game server and providing a second multiplayer game from the second game server.

2. The method according to claim 1, wherein the game state data of the game client being provided to the player upon the game client disconnecting from a game server is substantially the same as the game state data of the game server except for the predetermined event.

3. The method according to claim 1, wherein selecting a second server with similar game state data comprises selecting a server with similar layout information.

4. The method according to claim 1, further comprising monitoring player state data describing a state of the player while the player is being provided the game.

5. The method according to claim 4, further comprising transmitting the player state data from the game to the second game server.

6. The method according to claim 1, wherein the detecting a predetermined event in the game comprises obtaining a message from the first game server regarding the predetermined event.

7. The method according to claim 1, further comprising providing game client information for the game client to the second game server, prior to connecting the game client to the second game server.

8. The method according to claim 7, wherein the game client information for the game client to the second game server comprises current status information about a player character in the game.

9. A game client adapted for providing a multiplayer game in a computer network, the game client being adapted for connecting to a plurality of game servers, each game server comprising a plurality of game slots for the multiplayer game, each game server adapted for providing a game to game clients connected to that game server, each game server comprising game state data describing the state of the game,
wherein the game client is adapted to:
obtain a first multiplayer game from a first game server;
obtain a message from an arbiter node to disconnect from the first game server in response to a predetermined event in the first game, the predetermined event includes at least a player is eliminated from the first game;
provide a single player game in response to the message from the arbiter node; and
obtain from an arbiter node server information for a second game server and
connect the game client to the second game server and providing a second multiplayer game from the second game server.

10. An arbiter node for use in a computer network providing a multiplayer game, the arbiter node being adapted for connecting to a plurality of game servers, each game server comprising a plurality of game slots for the multiplayer game, each game server adapted for providing a game to game clients connected to that game server, each game server comprising game state data describing the state of the game;
the arbiter node further being adapted to connect to a game client in a first multi-player game provided by a first game server,
wherein the arbiter node is adapted to:
monitor the state of the first game being provided from the first game server;
detect a predetermined event in the first game being provided from the first game server, wherein the predetermined event comprises that a player is eliminated from the first game;
in response to detecting the predetermined event, sending a message to the game client with information about the predetermined event;
monitor the other game servers in order to find other game servers with suitable game state data;
select a second game server based on game state data; and
provide server information of the second game server to the game client.

* * * * *